Patented Apr. 21, 1953

2,636,037

UNITED STATES PATENT OFFICE 2,636,037

2-AMINO-4-PIPERIDINOETHYL-THIAZOLE

James M. Sprague, Drexel Hill, and Anthony H. Land, Ridley Park, Pa., assignors to Sharp & Dohme, Incorporated, Philadelphia, Pa., a corporation of Maryland No Drawing. Application October 10, 1947, Serial No. 779,214

1 Claim. (Cl. 260—293.4)

This invention relates to new derivatives of thiazole, which are useful as intermediates suitable for preparing other compounds which may show therapeutic application, and some of which thiazoles indicate varied effectiveness as antithyroid agents. The new compounds of the invention may be represented by the formula

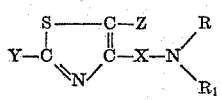

in which Y represents the amino group $NH_2$, or a substituted amino group in which one or both of the amino hydrogens is replaced by an alkyl, aralkyl, alicyclic, or aryl group or groups or one is replaced by an acyl group, in which X represents $-CH_2-$ or $-CH_2CH_2-$, or a $-CHR_2CH_2-$ group in which $R_2$ represents a lower alkyl group, R and $R_1$ represent hydrogen or alkyl, aryl, aralkyl, alicyclic or alkenyl groups, or in which R and $R_1$ taken together constitute part of a ring system as in piperidine, morpholine, tetrahydroquinoline, tetrahydroisoquinoline, and the like, and in which Z represents hydrogen or an alkyl group joined to one of the carbon atoms of the group X to form a fused cyclic structure with the thiazole radical as in the benzothiazole or tetrahydrobenzothiazole structure.

The new compounds of the present invention may be prepared by reaction of thiourea, or a monosubstituted or unsymmetrical disubstituted thiourea, with an alpha-bromoketone with elimination of HBr and water to form the thiazole structure. Compounds in which the group X is $-CH_2-$ may be conveniently prepared by reaction of an amine, particularly a secondary amine, with 2-amino or 2-substituted amino-4-chloromethylthiazole, which in turn may be prepared from alpha, gamma-dichloroacetone and thiourea or a monosubstituted or unsymmetrical disubstituted thiourea. The acylamino compounds may be prepared from the amino compounds by treatment with an acylating agent, as, for example, acetic anhydride, propionyl chloride, acetyl chloride, benzoyl chloride or the like, but are advantageously prepared by the use of an acylthiourea as an initial reactant. In general, any hydrocarbon groups present should not have in excess of 10 carbon atoms, and, in the case of the acyl compounds, the carbon linked chain of the acyl group should not have more than 7 carbon atoms.

The preparation of the new compounds will be illustrated by the following examples, but the invention is not limited thereto.

*Example 1.—2-amino-4-dimethylaminomethylthiazole.*—To a solution of 20 parts of dimethylamine in 80 parts of anhydrous ethanol was added 21.8 parts of 2-amino-4-chloromethylthiazole hydrochloride. After standing overnight at room temperature, the solution was heated under reflux for ½ hour and was then evaporated to dryness under vacuum. The residue was dissolved in 75 parts of water and made strongly alkaline with 20% caustic soda solution, precipitating brown crystals, M. P. 147–149° C., which on recrystallization from benzene gave pale yellow crystals, M. P. 150–151.5° C.

*Example 2.—2-amino-4-diethylaminomethylthiazole.*—5.5 parts of 2-amino-4-chloromethylthiazole hydrochloride in 40 parts of ethanol was stirred vigorously while 66 parts of diethylamine dissolved in 12 parts of ethanol was added dropwise. A crystalline precipitate began to form in about half an hour. The next day the solvent was removed by distillation in vacuo. The residue was dissolved in dilute hydrochloric acid, the solution covered with a layer of ether and made strongly alkaline with 20% sodium hydroxide solution. The mixture was shaken, the layers separated and the ether extract dried with anhydrous sodium sulfate. Evaporation of the ether left a residue of oil which was dissolved in 15 ml. of 6 M hydrochloric acid. The solution was made basic and extracted. Evaporation of the ether extract again left an oil that partially solidified when stirred. Recrystallization from hexane yielded sticky brown crystals. This was dissolved in 16 parts of isopropyl alcohol and the solution then was saturated with hydrogen chloride. Upon cooling, the solution deposited the white crystalline hydrochloride, M. P. 206–207° dec. Recrystallization from a mixture of ethanol and ethyl acetate yielded crystals, M. P. 206–207°. The free base was prepared from the hydrochloride and, after two recrystallizations from hexane, white needles, M. P. 63.5–64.5°, were obtained.

*Example 3.—2-amino-4-piperidinomethylthiazole.*—12 parts of piperidine were added to a solution of 9.25 parts of 2-amino-4-chloromethylthiazole hydrochloride in 80 parts of anhydrous alcohol. After standing at room temperature overnight, the alcohol was distilled in vacuo. The dark semi-solid residue was suspended in 60 ml. of water and acidified with hydrochloric acid to obtain a clear brown solution which was partially decolorized by two treatments with "Norit." The addition of an excess of 20% sodium hydroxide precipitated brown crystals of the aminothiazole. This was dissolved in dilute hydrochloric acid, decolorized and precipitated with sodium hydroxide to give light yellow crystals, M. P. 158–161°. Recrystallization from dilute alcohol gave material melting at 163°.

*Example 4.—2-amino-4-piperidinoethyl - thiazole.*—1-bromo-4-piperidino-2 - butanone hydrobromide was prepared by adding 50 ml. of a 35% solution of hydrogen bromide in glacial acetic acid to 34 g. of 4-piperidino-2-butanone dissolved in 50 ml. of the same solvent. The hot solution was stirred vigorously while 35 g. of bromine in 33 ml. of glacial acetic acid was added dropwise, at a rapid rate. The addition of 300 ml. of i-propyl ether precipitated a dark brown oil that soon solidified. The solid was dissolved in boiling i-propyl alcohol and the resulting solution was partially decolorized by treatment with "Darco." On cooling, the solution deposited brown crystals, M. P. 154–156°. After repeated recrystallization from i-propyl alcohol, the product melted at 157–158°. To a solution of 6.3 grams of this and 1.52 grams of thiourea in the minimum quantity of water was allowed to remain at room temperature for eighteen hours. The solution was partially decolorized by treatment with "Norit" and then made alkaline with 20% sodium hydroxide solution to precipitate yellow crystals; M. P. 134–135° after three recrystallizations from i-propyl ether. The dihydrochloride was precipitated by adding isopropyl ether to a solution of the base in ethanolic hydrogen chloride. After repeated recrystallization from i-propyl alcohol containing a little hydrogen chloride, the product melted at 188–189°.

*Example 5.—2-amino-4-(2-(1,2,3,4-tetrahydroisoquinolino)-ethyl)-thiazole.*—A solution of 7.35 grams of 1-bromo-4-(1,2,3,4-tetrahydroisoquinolino)-2-butanone hydrobromide (prepared by bromination in glacial acetic acid of the corresponding ketone hydrobromide) and 2 grams of thiourea were dissolved in 75 ml. of water containing 0.25 ml. of concentrated hydrochloric acid and left at room temperature for sixteen hours. The filtered solution was made strongly basic with 20% aqueous sodium hydroxide. The semi-solid precipitate was dissolved in isopropyl ether and the solution was dried with anhydrous sodium sulfate. Evaporation of the ether gave white crystals; M. P. 92–94°, which turned brown within several days. A sample recrystallized once from hexane and twice from i-propyl ether melted at 93–93.5° The dihydrochloride, prepared in ethanol and precipitated with i-propyl ether, melted at 209–210° (dec.).

*Example 6.—2-amino-4-dimethylaminomethyl-4,5,6,7 - tetrahydrobenzothiazole.*—Dry hydrogen bromide was passed into a solution of 25.5 g. of 2-dimethylaminomethylcyclohexanone in 150 ml. of i-propyl ether. The precipitated hydrobromide, M. P. 165–166.5°, was dissolved in 100 ml. of hot glacial acetic acid and the solution was stirred and illuminated with a 75-watt lamp while 25 g. of bromine in 20 ml. of acetic acid was added. After a few minutes the mixture set to a mass of white crystals. The solid was stirred with 350 ml. of i-propyl ether, filtered, suspended in 200 ml. of acetone, and filtered again; M. P. 162–163°. Forty grams of the crude bromoaminoketone salt and 9.8 g. of thiourea were dissolved in 100 ml. of warm water containing 0.5 ml. of concentrated hydrochloric acid. The solution then was heated on a steam-bath for one and one-half hours, cooled and made strongly alkaline with 20% sodium hydroxide solution. The resulting suspension was shaken with i-propyl ether and the extract was dried with anhydrous sodium sulfate. Evaporation of the ether gave yellow crystals; M. P. 105–107°. Repeated crystallization from i-propyl ether gave white crystals; M. P. 106–107.5°. An acetyl derivative was prepared by warming the aminothiazole with acetic anhydride in glacial acetic acid. The cooled solution was neutralized with sodium hydroxide to precipitate the amide which melted at 179.5–180°, after repeated crystallization from 20% ethanol.

*Example 7.—2 - amino - 4 - piperidinomethyl-4,5,6,7 - tetrahydrobenzothiazole.*—Eighty - three grams of piperidine hydrobromide, 200 g. of cyclohexanone and 45 g. of 35% aqueous formaldehyde solution were heated on a steam-bath for forty minutes, during which time the mixture became homogeneous. The cold, solid mixture was stirred with 300 ml. of ether, filtered and washed with ether; M. P. 183–184° (dec.) after recrystallization from isopropyl alcohol. Since further recrystallization was accompanied by darkening and a decrease in melting point, additional purification was not attempted. Eighty-three grams of the aminoketone hydrobromide was dissolved in 300 ml. of glacial acetic acid and stirred while 48 g. of bromine in 50 ml. of glacial acetic acid was added. After the addition of a liter of i-propyl ether, stirring was continued until the oily precipitate of bromoketone salt solidified. The yellow solid was washed with ether; M. P. about 145° (dec.). Recrystallization from isopropyl alcohol-ethyl acetate mixture did not produce a sharply melting product. Twenty grams of the bromoketone and 4.8 g. of thiourea were dissolved in 100 ml. of water and, after two hours, the solution was heated on a steam-bath for one-half hour. The solution then was cooled, made basic with 20% aqueous sodium hydroxide. After the gummy yellow precipitate had solidified to a hard resinous mass, it was pulverized and washed with water. It then was suspended in boiling water and dissolved by the gradual addition of ethanol. The solution was treated with "Darco" and, upon cooling, deposited crystals, M. P. 146–148°. A second crop, M. P. 145.5–146.5°, was obtained by adding water to the mother liquor. After two crystallizations from a benzene-hexane mixture, the melting point was 146.5–148°.

*Example 8. — 2-amino-4-(2-dimethylaminoethyl)-thiazole.*—45 parts of 1-bromo-4-dimethylamino-2-butanone hydrobromide were added to a solution of 12.2 parts of thiourea in 200 parts of water. The solution, which had become warm, was allowed to remain at room temperature for 12 hours. After the solution had been partially decolorized by shaking it with decolorizing carbon, an excess of 20% aqueous sodium hydroxide was added, whereupon the amine precipitated. After recrystallization from isopropyl ether it melted at 128–129° C. The dihydrochloride was prepared by passing hydrogen chloride into an alcohol solution of the base and precipitating the salt with isopropyl ether. This was recrystallized from ethanol to a constant melting point of 139–141° C. with effervescence.

Other compounds included within the invention, and which are readily prepared by the procedures illustrated in detail in the foregoing examples are:

2 - methylamino-4-morpholinomethylthiazole prepared from 2-methylamino-4-chloromethylthiazole and morpholine;

2 - ethylamino - 4 - dibenzylaminomethylthiazole, prepared from 2-ethylamino-4-chloromethylthiazole and dibenzylamine;

2 - benzylamino - 4 - diphenylamino-methyl-thiazole, prepared from diphenylamine and 2-benzylamino-4-chloromethylthiazole;

2 - phenylamino - 4 - cyclohexylmethylamino-methylthiazole, prepared from 2-phenylamino-4-chloromethylthiazole and cyclohexylmethylamine;

2 - acetoamino - 4 - dimethylaminomethyl-thiazole, prepared from 2-acetoamino-4-chloromethylthiazole and dimethylamine; and 2 - benzoylamino - 4 - dimethylaminomethyl-thiazole, prepared from 2 - benzoylamino - 4-chloromethylthiazole and dimethylamine.

We claim:
2-amino-4-piperidinoethyl-thiazole.

JAMES M. SPRAGUE.
ANTHONY H. LAND.

References Cited in the file of this patent
UNITED STATES PATENTS

| Number | Name | Date |
|---|---|---|
| 2,409,828 | Bock | Oct. 22, 1946 |

OTHER REFERENCES

Land et al., J. Am. Chem. Soc., vol. 68, pp. 2155-2159 (1946).